United States Patent
Hancock et al.

(10) Patent No.: US 6,442,757 B1
(45) Date of Patent: Aug. 27, 2002

(54) SYSTEM AND METHOD OF CHANNEL MAP CORRECTION IN AN EPG GUIDE

(75) Inventors: Kenneth S. Hancock, Nashua, NH (US); Peter C. Schoaff, Westford, MA (US); Eric T. Shalkey, Methuen, MA (US); Wensdy Whitehead, Bedford, MA (US); Douglas B. Macrae, Weston, MA (US)

(73) Assignee: Index Systems, Inc. (VG)

( * ) Notice: Subject to any disclaimer, the term of this patent is extended or adjusted under 35 U.S.C. 154(b) by 0 days.

(21) Appl. No.: 09/526,306

(22) Filed: Mar. 15, 2000

Related U.S. Application Data

(60) Provisional application No. 60/124,476, filed on Mar. 15, 1999.

(51) Int. Cl.[7] .......................... H04N 5/445; H04N 7/16
(52) U.S. Cl. .......................... 725/50; 725/49; 725/140
(58) Field of Search ............................ 725/39, 48, 53, 725/50, 57, 132, 140, 152, 49; 348/731, 732; H04N 7/16, 7/173, 5/445

(56) References Cited

U.S. PATENT DOCUMENTS

| | | | | |
|---|---|---|---|---|
| 5,666,645 A | * | 9/1997 | Thomas et al. | 455/6.1 |
| 5,703,795 A | * | 12/1997 | Mankovitz | 364/514 A |
| 5,886,995 A | * | 3/1999 | Arsenault et al. | 348/384 |
| 6,252,634 B1 | * | 6/2001 | Yuen et al. | 348/731 |

FOREIGN PATENT DOCUMENTS

JP      10023344      1/1998

OTHER PUBLICATIONS

Copy of International Search Report, PCT/US00/06833, filed Mar. 15, 2000, 7 pages.

* cited by examiner

*Primary Examiner*—Chris Grant
(74) *Attorney, Agent, or Firm*—Christie, Parker & Hale, LLP

(57) ABSTRACT

A channel map in an electronic television program guide system that includes channel numbers and alphanumeric channel labels is updated. The tuner in the system is tuned to a channel number of a television channel that is included in the channel map. Data is extracted from the television signal that includes an alphanumeric label for the tuned television channel. The channel map is revised according to the alphanumeric label for the tuned television channel if the alphanumeric label in the extracted data for the tuned television channel does not correspond with the alphanumeric channel label stored in the channel map for the tuned television channel.

20 Claims, 2 Drawing Sheets

SYSTEM AND METHOD OF CHANNEL MAP CORRECTION IN AN EPG GUIDE

CROSS-REFERENCE TO RELATED APPLICATIONS

This application claims priority of U.S. Provisional Patent Application No. 60/124,476, filed on Mar. 15, 1999, the disclosure of which is incorporated fully herein by reference.

BACKGROUND OF THE INVENTION

The present system and method of channel map correction in an EPG uses a television broadcast system as described in International Application No. PCT/US96/17920, an electronic program guide ("EPG") as described in U.S. application Ser. No. 09/120,488, a method and apparatus for transmitting and downloading setup information as described in International Application No. PCT/US97/00739 which are incorporated into this application by reference. Appendix A describes the method of using XDS call letter data to correct channel maps. Appendix A are incorporated into this application by reference.

In a television system capable of receiving television programs from various programming sources, e.g. cable, antenna, or satellite, two or more sources may carry an identical television station (e.g. XNBC is carried by both cable and satellite). Thus, in presenting program listings of all the sources in a single guide format, it is desirable to delete duplicative stations to conserve memory and avoid cluttering of the guide with duplicative program information.

SUMMARY OF THE INVENTION

According to one aspect of the invention, a channel map in an electronic television program guide system that includes channel numbers and alphanumeric channel labels is updated. The tuner in the system is tuned to a channel number of a television channel that is included in the channel map. Data is extracted from the television signal that includes an alphanumeric label for the tuned television channel. The channel map is revised according to the alphanumeric label for the tuned television channel if the alphanumeric label in the extracted data for the tuned television channel does not correspond with the alphanumeric channel label stored in the channel map for the tuned television channel.

BRIEF DESCRIPTION OF THE DRAWINGS

The objects, advantages and features of this invention will become more apparent from a consideration of the following detailed description and the drawings in which.

DETAILED DESCRIPTION

Figure 1:
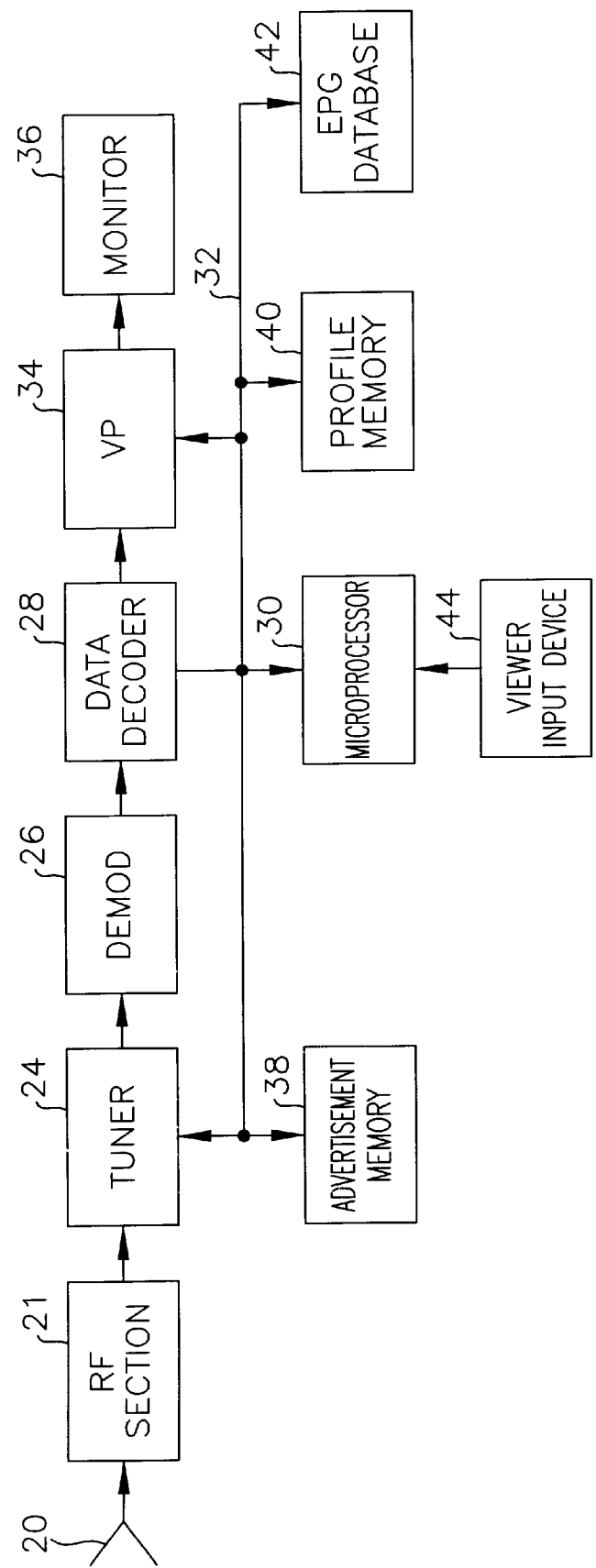
FIG. 1 is a schematic block diagram of a television receiver for practicing the invention.
Figure 2:
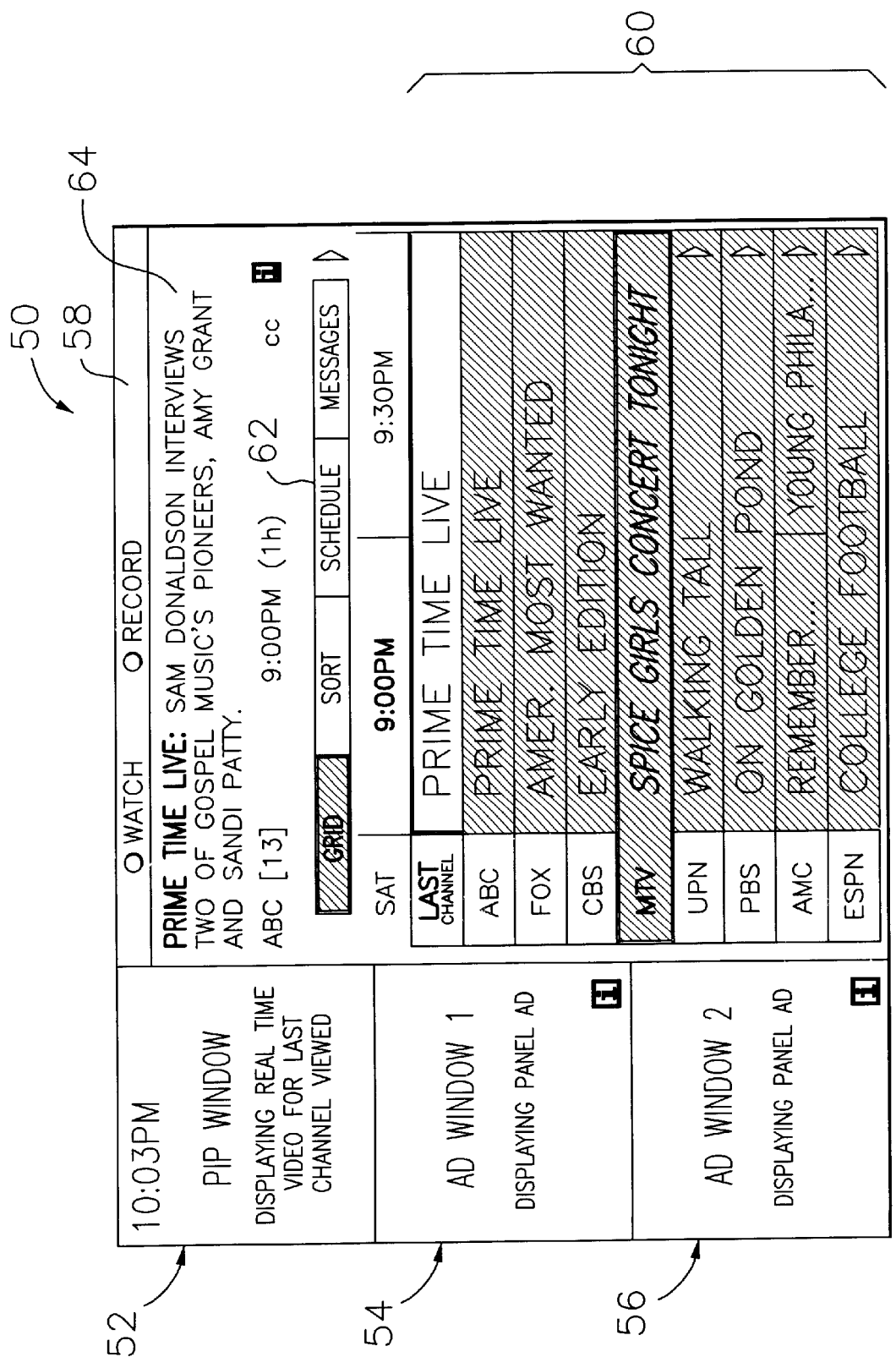
FIG. 2 illustrates a typical EPG screen on a television monitor at the receiver of FIG. 1.

International application Ser. No. PCT/US97/00739 discloses a television system which receives television transmission from either over-the-air ("OTA") broadcast, cable ready signals, or cable box signals. It also describes a way to transmit and download setup information for that television system. The system described there automatically generates a channel map corresponding to the source of the television transmission. A channel map relates television station call letters to their respective channel allocations.

In a preferred embodiment, the system and method disclosed in International application Ser. No. PCT/US97/00739 is extended to handle the situation where a single television system is capable of tuning to multiple television sources, including satellite and digital sources, and receives a channel map from each of the sources. A single television guide is then created based on the channel maps. This guide tells you how to find a channel, regardless of its source. It is desirable to do this in a way that eliminates redundant listings, and conserves memory.

A channel map will be generated for each program source. Initially the viewer inputs the sources of programming available to his television, such as a cable subscription and/or a DSS unit. The user also inputs their zip code. Zip code allows transmission of program line ups that are available in an area to be picked up by the subscriber's receiver.

The user, through a remote control unit, issues a set up command, which is transmitted to a main micro controller in the television system which initiates a auto set up procedure telling program stored in internal memory that will include declaring a channel map.

The channel mapping program accesses an extended channel map selection packet. A channel map ID based on the inputted zip code is identified. A channel map corresponding to the identified channel map ID is then downloaded into the system.

Each local host station provides channel mapping information to the viewer. This is done by transmitting an extended channel map ("XCM") packet with television channel allocations (receiving channel numbers) corresponding to Channel ID. The XCM packet also transmits a "channel map type" field that identifies the multiple programming sources. This field has several attributes: dual (A/B) trunk, digital signal, and system type. If the dual trunk bit is clear, the system is single trunk (or other feed such as OTA or DSS). If the digital signal bit is clear, the signal is analog. The system type attribute allows specification of the type of source (e.g. OTA=0, cable=1, and satellite=2).

The channel ID is used to select the appropriate guide channel(GCH)-to-call-letter mapping from the extended source map ("XSM") packet. Information in the XCM and XSM packets are then merged to create a lineup. An example of a source map, a channel map, and a finalized lineup is shown below.

| SOURCE MAP | |
|---|---|
| Channel | Call Letters |
| Channel 2 | WGBH |
| Channel 3 | Sports |
| Channel 4 | WBZ |
| . | . |
| . | . |
| . | . |
| Channel 25 | HBO |

| LINE UP | |
|---|---|
| Channel ID | Receive Channel |
| Channel 2 | 002 |
| Channel 4 | 004 |
| Channel 25 | 301 |

-continued

FINALIZED LINE UP

| Channel ID | Receive Channel | Call Letters |
|---|---|---|
| Channel 2 | 002 | WGBH |
| Channel 3 | — | Sports |
| Channel 4 | 004 | WBZ |
| . | | . |
| . | | . |
| . | | , |
| Channel 25 | 301 | HBO |

After channel maps of all the sources have been generated, the system merges the channel maps into a single merged channel map. However, channel maps frequently change. To facilitate these changes network name (affiliation) and call letters (station ID) from the channel information class of the XDS data corrects the lineups automatically. An exemplary embodiment of the invention consists of firmware that stores a list of channel names in its source map. The firmware also stores a list of all receiver channels on which the channels are received in the channel map. As with the source map the channel map is an array, of which a channel ID is an index. The algorithm for updating the channel map is given in detail in Appendix A.

The first step is to initiate a search. This is done by pointing the data tuner to a channel for which the XDS data is to be examined. The XDS feed for a given station is examined for call letters or network name. When these appear the Channel map stored in the viewers location is queried. If the station on which the channel is stored differs from the one on the XDS feed, a full search is scheduled for a non download period.

The next step is to scan the channel map. This must be done between downloads so that sufficient time for a search is available.

The receiver channel from the channel map for any channels in the source map whose call letters match those found in the XDS data, is compared to the current channel. If they match, nothing is done. If they do not match a check is later made to determine if this is a split channel. If not a split channel the receiver channel found in the channel map is checked for XDS data.

Data collected from the original channel can lead to 3 cases which must be analyzed, as described in Appendix A. If this original channel has the same data as the scan channel, no change is made. If no data or different XDS data is present here, on the original channel, the channel map will be corrected. However if it is determined that the user has edited this channel a correction will not be made.

In an alternate embodiment it may be desirable to collect XDS data from all channels if the call letter data on the scan channel does not match the channel map.

Additionally this embodiment is designed to support digital television. In digital television, a television station can divide its bandwidth so that multiple sub channels are available. For example it is desirable to use the full bandwidth for movies or other transmissions that need the highest image quality. For news shows, for example, a high quality picture might not be necessary, or desired. If this is the case the channel can be divided to show several programs on sub channels. The number of sub channels can expand and contract during the day. It is desirable to list these sub channels in the guide.

The Use of XDS Call Letter Data to Correct Channel Maps

Ken Hancock
Jacques Hugon
P. Christopher Schoaff
Eric Shalkey
Wensdy Whitehead

Goals of Project

Channel Maps for cable systems can chance frequently as channels are added, removed, or moved. This presents us with the challenge of updating our data stream to match these changes. Often we will not have advanced information that the lineup will change and we can only react to these changes, leading to customer service calls from users whose lineup is not incorrect.

Our desire is to use the Network Name (affiliation) and Call Letters (Station ID) packets from the Channel Information Class of the XDS data to correct some lineups automatically. This information is currently included on few, if any stations but we expect it to become more common in the future. To that end we wish to be prepared to take advantage of this resource.

XDS Data Available

There are two packets of interested to us that are specified in EIA-608, section 6.5.3. It is recommended that the following packets be considered "high priority" and thus sent out every 2 to 4 seconds; however, this is only a recommendation and the actual interval is left up to the originating station.

The following is from the EIA-608 specification. Grammar and punctuation errors are copied from the original.

6.5.3 Channel In formation Class
01h Network Name (affiliation)

This packet contains a variable number, 2 to 32, of characters that define the network name associated with the local channel. Each characters is an ASCII character in the range of 20h to 7Fh. Each network should use a short, unique and consistent name so that receivers could access internal information, like a logo, about the network.

6.6.2.7 Network Name (affiliation)

The network name should be kept short and should always be consistent. Standard letter abbreviations are the preferred method. Network names longer than 18 characters should be avoided due to additional overhead that is used, thereby slowing the repetition rate.

6.5.3 Channel Information Class
02h Call Letters (Station ID) and Native Channel This packet contains four or six characters. The first four will define the call letters of the local broadcasting station. Each characters is an ASCII character in the range of 20h to 7Fh. A four-letter abbreviation of the network name may also be substituted for the four character call letters.

When six characters are used, the last two a r e ASCII characters that are used to indicate the channel number that is assigned by the FCC to the station for local over-the-air broadcasting. In a CATV system, the native channel number is frequently different than the CATV channel number which carries the station. The valid range for these channels is 2–69, Single digit numbers may either be preceded by a zero or a standard null.

While five or six letter names or abbreviations are technically permitted (instead of 4 characters and two numerals) as all characters are ASCII, they should be avoided as some TV receivers may only use the first four letters.

6.6.2.8 Call Letters (Station ID) and Native Channels

This packet should be used only for standard four (or three) letter FCC call letters. Cable programming channels should use the network Name packet. If there are more than 4 characters in the call letters, the station must truncate to four characters. Substituting another acronym for the call letters ("TV10", etc.) is acceptable.

A station may choose to include the native channel number to indicate the designated VHF/UHF channel assignment when that station is carried on a different channel by CATV companies.

Definitions and Discussion of Firmware Data

The firmware stores a list of all the Channel Names in the Source Map. For OTA channels the Channel Name will be the channels FCC supplied Call Letters. F or cable only channels it can be any name up to 8 characters. This list is an array, the index of which is a Guide Channel. For Guide 99 the guide channel will be a 16 bit number.

The firmware stores a list of all receiver channels on which the channels are received in the Channel Map. Like the source map, the channel map is an array the index of which is a Guide Channel.

General Algorithm

In general, the way we intend to update entries in the channel map is as follows.

1. When to Initiate a Search

In order to examine XDS data for a channel we must point the data tuner at that channel. this means it is not practical to examine XDS data while we are in download, but outside of download periods we can have the data tuner follow the Picture Tuner as the user changes channels and attempt to collect the Call Letter and Network Name packets. In a single tuner system this happens automatically, in a dual tuner system the Host will allow when the user is not using the PIP. While in the Guide itself we can also collect XDS data on whatever channel the PIP is tuned to.

Whenever we see Call Letters or a Network Name in the XDS feed for a given station we will look up those call letters in our Channel Map and determine on which channel we believe that station should be. If the station we believe the channel should be on differs from the channel on which we found the XDS data we will schedule a full XDS data search for a non-download period. Note, given that not all instances of call letter variations will be corrected we will need to keep track of known but uncorrectable variations to prevent them from repeatedly generating XDS data searches. Note, this does assume that Call Letters and Network Names are unique which will be addressed below.

2. Scanning a Channel Map

Once a full XDS data search has been requested the slicing engine should select a time period between downloads when it will have enough time to complete a full search. If stations follow the guidelines in EIA-608 we will only have to pause about 5 seconds on each station to receive the relevant XDS Data. This means a search should take less than half an hour to complete (255 channels*5 seconds per channel). However, we do need to spend enough time on each station to receive both the Call Letter and Network Name packets if they are available. During this search it is important to we receive the most significant channel name information. If we only receive a Network Name packet when a Call Letter packet is available we may during a later comparison generate a false negative. Theoretically Call Letter packets should always override Network Name packets as Cable Channels should not send out Call Letter packets and for OTA channels we will use the Call Letters in the source map.

Once we receive the appropriate XDS packets we decide what information to search for in the source map. As previously mentioned, if we only receive a Network Name packet, we will search for the network name in the source map. If, however, receive a Call Letters packet, we will search for the call letters. If we receive neither no search is made and we continue to the next channel.

If the search finds a match in the source map we compare the receiver channel returned with the current channel. If they match this simply confirms that our channel map is correct and we continue to the next channel. If they do not match, we make sure that neither the returned channel nor the current channel is a split channel, the reason for this will be explained in the next section, Analyzing Apparent Channel Map Changes. If neither is a split channel, we must test the receiver channel found by the source map search itself for XDS data.

3. Analyzing Apparent Channel Map Changes

At this point we are on a channel (scan channel) which has XDS data for one station, but we believe that station should be on a different channel (original channel). At this point we must tune to the original channel and collect XDS data from there. This can lead to three cases.

a) No XDS data found on the original channel. This could mean one of three things.
   I) A different station that has no XDS data is now on the original channel.
   II) The original channel is a split channel that carries the station we are looking for only part of the day.
   III) The original channel is the station we are looking for, but that channel does not have XDS data.
b) XDS data is found on the original channel and it is for the same station. This case is pretty clear, it appears the same station is carried on two channels.
c) XDS data is found on the original channel and it is for a different station. This can mean one of two different things.
   I) A different station is now on the original channel.
   II) The original channel is a split channel that carries the station we are looking for only part of the day.

In considering all of these cases we have three goals. First, to only set a station to a channel if that station is received on that channel. Second, to make sure that we do not cause station oscillation in the channel map, that is we want to make sure whatever correction we make is not reversed during the next XDS scan. Finally, we want a station set to the best channel if it is on multiple channels. This is, of course, a very subjective criteria but it should be kept in mind.

For condition b it is obvious that no change should be made to the channel map.

For condition a, we would want to change the channel map if instance I occurred, but not in instances II or III. I believe that instance III will be very rare and not worth considering unless XDS data is transmitted intermittently. This is addressed below. Even if it did occur the correction would not cause station oscillation.

Instance II in conditions a and b is troublesome as it could lead to station oscillation, especially if the scan channel is also a split channel. However we can protect ourselves against this by not correcting split channels. We can accomplish this by making sure that neither the scan channel nor the original channel has more than one station assigned to it.

To summarize, we do not attempt to correct split channels. If neither the original nor the scan channel is a split channel we compare the XDS data on those two channels. We do not make any change if the original channel has the same XDS data as the scan channel. If there is different or no XDS data on the original channel will correct the channel map.

4. Correcting the Channel Map

If we decide that the scan channel should be the receiver channel for the station found in the source map the Program Manager will attempt to make that change.

The Program Manager has one additional criterion it will check before allowing the station to receive a new receiver channel. If the user has edited the receiver channel for that station the Program Manager will not accept the change. Otherwise it will modify the channel map as requested.

5. Optional Implementations

Rather than collecting XDS data from the original channel whenever we find Call Letter data on a scan channel which does not match our channel map, we may wish to collect XDS data from all channels, buffer it, and then compare. However, this would exacerbate problems caused by stations only transmitting Call Letters part of the time.

Unknown Variables May Prevent Correct Operation

1. Unknown Channel Names

There are a few factors which will make it difficult to use XDS data to correct channel maps in the near future. The first is unreliable data. It is unclear which channels will transmit the call letter XDS data, and of the stations that do, it is not known what call letters or network names they will use. This presents us with the possibility that we could change a channel from the correct channel to an incorrect one.

To demonstrate this, imagine a hypothetical situation where two HBO stations are available (HBO East and HBO West). If we called the stations HBO for East and HBO2 for West in our lineup, but HBO transmitted the Call Letters HBO for West and HBO2 for East. We would of course change the channel for HBO East to that of HBO West. While this is, of course, an unlikely scenario is demonstrates the danger of attempting to make changes without knowing what data is being transmitted.

2. Channels Broadcasting Call Letters Intermittently.

If a cable lineup has the same station being carried on two channels we could easily end up changing the channel of one station to that of the other. If we found one channel during the scan, but when we switched to the original channel that station had stopped transmitting XDS data this would be condition a-III above.

3. Network Name Identical to Another Station's Call Letters

We know that no two stations will share call letters, but it is conceivable that a cable stations chosen Network Name may be the same as the call letters of another station (WIN vs. Win) as network names are not assigned by the FCC. This is highly unlikely but should be watched.

4. Cable Channels Using Call Letter Packets

Of all the potential problems we may run into, this is the most likely. If we assumes that Cable Stations will only transmit the Network Name packet and OTA Stations will only transmit the Call Letter packet then channel scans are simple; we scan the XDS on a given channel until we see either a Call Letter or Network Name packet. However, if in addition to Network Name packets cable stations also start sending out Call Letter packets we could not assume that our search on a given channel is finished when we see a Call Letter packet.

What is claimed is:

1. A method of updating a channel map in an electronic television program guide system that includes channel numbers and alphanumeric channel labels comprising:

tuning to channel number of a television channel that is included in the channel map;

extracting data from the television signal including an alphanumeric label for the tuned television channel;

revising the channel map according to the alphanumeric label for the tuned television channel if the alphanumeric label in the extracted data for the tuned television channel does not correspond with the alphanumeric channel label stored in the channel map for the tuned television channel; and wherein tuning to channel number occurs during predetermined time periods, the predetermined time periods being determined by a processor as a sufficient period of time to extract data and revise the channel map.

2. A method of updating a channel map in an electronic television program guide system that includes channel numbers and alphanumeric channel labels comprising:

tuning to channel number of a television channel that is included in the channel map;

extracting data from the television signal including an alphanumeric label for the tuned television channel;

revising the channel map according to the alphanumeric label for the tuned television channel if the alphanumeric label in the extracted data for the tuned television channel does not correspond with the alphanumeric channel label stored in the channel map for the tuned television channel; and wherein tuning to channel number based on input from a remote control unit, the input comprising one of a zip code and a setup command.

3. A method of updating a channel map in an electronic television program guide system that includes channel numbers and alphanumeric channel labels comprising:

tuning to channel number of a television channel that is included in the channel map;

extracting data from the television signal including an alphanumeric label for the tuned television channel;

revising the channel map according to the alphanumeric label for the tuned television channel if the alphanumeric label in the extracted data for the tuned television channel does not correspond with the alphanumeric channel label stored in the channel map for the tuned television channel;

identifying a source of programming available;

inputting a postal zip code; and initiating a channel map setup function to start tuning to channel number of a television channel based on the identified source of programming and the inputted postal zip code.

4. A method of updating a channel map in an electronic television program guide system that includes channel numbers and alphanumeric channel labels comprising:

tuning to channel number of a television channel that is included in the channel map;

extracting data from the television signal including an alphanumeric label for the tuned television channel;

revising the channel map according to the alphanumeric label for the tuned television channel if the alphanumeric label in the extracted data for the tuned television channel does not correspond with the alphanumeric channel label stored in the channel map for the tuned television channel;

identifying a source of programming available;

inputting a postal zip code; and retrieving the channel map based on the identified source of programming and the inputted postal zip code.

5. The method of claim 4 further comprising initiating a channel map setup function to start tuning to channel number of a television channel based on the identified source of programming and the inputted postal zip code.

6. A method of updating a channel map in an electronic television program guide system that includes channel numbers and alphanumeric channel labels comprising:

tuning to channel number of a television channel that is included in the channel map;

extracting data from the television signal including an alphanumeric label for the tuned television channel;

revising the channel map according to the alphanumeric label for the tuned television channel if the alphanumeric label in the extracted data for the tuned television channel does not correspond with the alphanumeric channel label stored in the channel map for the tuned television channel; and continuing to tune to each channel number of each television channel that is included in the channel map, to extracting data from each television signal including an alphanumeric channel label for each tuned television channel, and to revising the channel map according to the alphanumeric channel label for each tuned television channel in which the alphanumeric channel label in the extracted data for each tuned television channel does not correspond with the alphanumeric channel label stored in the channel map for the tuned television channel.

7. A method of updating a channel map in an electronic television program guide system that includes channel numbers and alphanumeric channel labels comprising:

tuning to channel number of a television channel that is included in the channel map;

extracting data from the television signal including an alphanumeric label for the tuned television channel;

revising the channel map according to the alphanumeric label for the tuned television channel if the alphanumeric label in the extracted data for the tuned television channel does not correspond with the alphanumeric channel label stored in the channel map for the tuned television channel; and identifying if the channel map has been previously revised.

8. The method of claim 7 further comprising skipping the revising of the channel map based on identifying that the channel map has been previously revised.

9. A method of updating a channel map in an electronic television program guide system that includes channel numbers and alphanumeric channel labels comprising:

tuning to channel number of a television channel that is included in the channel map;

extracting data from the television signal including an alphanumeric label for the tuned television channel;

revising the channel map according to the alphanumeric label for the tuned television channel if the alphanumeric label in the extracted data for the tuned television channel does not correspond with the alphanumeric channel label stored in the channel map for the tuned television channel; and identifying the tuned television channel as a split channel, in which the tuned television channel includes a television signal that sends data including a first alphanumeric channel label during one time period and sends different data including a second alphanumeric channel label during another time period.

10. The method of claim 9 further comprising skipping the revising of the channel map based on identifying that the tuned television channel is a split channel.

11. A receiver for updating a channel map in an electronic television program guide system that includes channel numbers and alphanumeric channel labels, the receiver comprising:

a data tuner configured to tune to a channel number of a television channel that is included in the channel map;

memory storing a channel map;

decoder extracting data from the television signal including an alphanumeric label for the tuned television channel; and a processor configured to revise the channel map according to the alphanumeric label for the tuned television channel if the alphanumeric label in the extracted data for the tuned television channel does not correspond with the alphanumeric channel label stored in the channel map for the tuned television channel; and a second data tuner configured to tune to a channel number of a television channel that is included in the channel map when the data tuner is busy.

12. A receiver for updating a channel map in an electronic television program guide system that includes channel numbers and alphanumeric channel labels, the receiver comprising:

a data tuner configured to tune to a channel number of a television channel that is included in the channel map;

memory storing a channel map;

decoder extracting data from the television signal including an alphanumeric label for the tuned television channel;

a processor configured to revise the channel map according to the alphanumeric label for the tuned television channel if the alphanumeric label in the extracted data for the tuned television channel does not correspond with the alphanumeric channel label stored in the channel map for the tuned television channel; and wherein the processor is further configured to determine an occurrence of a predetermined time period and to cause the data tuner to tune to a channel number of a television channel included in the channel map when the predetermined time period has occurred, the predetermined time period being determined by a processor as a sufficient period of time to extract data and revise the channel map.

13. A receiver for updating a channel map in an electronic television program guide system that includes channel numbers and alphanumeric channel labels, the receiver comprising:

a data tuner configured to tune to a channel number of a television channel that is included in the channel map;

memory storing a channel map;

decoder extracting data from the television signal including an alphanumeric label for the tuned television channel;

a processor configured to revise the channel map according to the alphanumeric label for the tuned television channel if the alphanumeric label in the extracted data for the tuned television channel does not correspond with the alphanumeric channel label stored in the channel map for the tuned television channel; and wherein the data tuner is configured to tune to a channel number based on input from a remote control unit, the input comprising one of a zip code and a setup command.

14. A receiver for updating a channel map in an electronic television program guide system that includes channel numbers and alphanumeric channel labels, the receiver comprising:

a data tuner configured to tune to a channel number of a television channel that is included in the channel map;

memory storing a channel map;

decoder extracting data from the television signal including an alphanumeric label for the tuned television channel;

a processor configured to revise the channel map according to the alphanumeric label for the tuned television channel if the alphanumeric label in the extracted data for the tuned television channel does not correspond with the alphanumeric channel label stored in the channel map for the tuned television channel; and a remote control unit configured to receive input to identify a source of programming available and a postal zip code and to cause the processor to initiate a channel map setup function to start tuning to channel number of a television channel based on the identified source of programming and the inputted postal zip code.

15. A receiver for updating a channel map in an electronic television program guide system that includes channel numbers and alphanumeric channel labels, the receiver comprising:

a data tuner configured to tune to a channel number of a television channel that is included in the channel map;

memory storing a channel map;

decoder extracting data from the television signal including an alphanumeric label for the tuned television channel;

a processor configured to revise the channel map according to the alphanumeric label for the tuned television channel if the alphanumeric label in the extracted data for the tuned television channel does not correspond with the alphanumeric channel label stored in the channel map for the tuned television channel; and a remote control unit configured to receive input to identify a source of programming available and a postal zip code and to cause the processor to retrieve the channel map based on the identified source of programming and the inputted postal zip code.

16. A receiver for updating a channel map in an electronic television program guide system that includes channel numbers and alphanumeric channel labels, the receiver comprising:

a data tuner configured to tune to a channel number of a television channel that is included in the channel map;

memory storing a channel map;

decoder extracting data from the television signal including an alphanumeric label for the tuned television channel;

a processor configured to revise the channel map according to the alphanumeric label for the tuned television channel if the alphanumeric label in the extracted data for the tuned television channel does not correspond with the alphanumeric channel label stored in the channel map for the tuned television channel; and wherein the processor is further configured to determine an occurrence of a predetermined time period and to initiate a full channel search in which the data tuner is tuned to each channel number of each television channel that is included in the channel map, the decoder extracts data from each television signal including an alphanumeric channel label for each tuned television channel, and the processor revises the channel map according to the alphanumeric channel label for each tuned television channel in which the alphanumeric channel label in the extracted data for each tuned television channel does not correspond with the alphanumeric channel label stored in the channel map for the tuned television channel, when the predetermined time period has occurred.

17. A receiver for updating a channel map in an electronic television program guide system that includes channel numbers and alphanumeric channel labels, the receiver comprising:

a data tuner configured to tune to a channel number of a television channel that is included in the channel map;

memory storing a channel map;

decoder extracting data from the television signal including an alphanumeric label for the tuned television channel;

a processor configured to revise the channel map according to the alphanumeric label for the tuned television channel if the alphanumeric label in the extracted data for the tuned television channel does not correspond with the alphanumeric channel label stored in the channel map for the tuned television channel; and wherein the processor is configured to identify if the channel map has been previously revised by input from the remote control unit.

18. The receiver of claim 17 wherein the processor is further configured to prevent the revision of the channel map based on identifying that the channel map has been previously revised.

19. A receiver for updating a channel map in an electronic television program guide system that includes channel numbers and alphanumeric channel labels, the receiver comprising:

a data tuner configured to tune to a channel number of a television channel that is included in the channel map;

memory storing a channel map;

decoder extracting data from the television signal including an alphanumeric label for the tuned television channel;

a processor configured to revise the channel map according to the alphanumeric label for the tuned television channel if the alphanumeric label in the extracted data for the tuned television channel does not correspond with the alphanumeric channel label stored in the channel map for the tuned television channel; and wherein the processor is further configured to identify the tuned television channel as a split channel, in which the tuned television channel includes a television signal that sends data including a first alphanumeric channel label during one time period and sends different data including a second alphanumeric channel label during another time period.

20. The receiver of claim 19 wherein the processor is further configured to prevent the revision of the channel map based on identifying the tuned television channel being a split channel.

* * * * *